Patented Nov. 14, 1950

2,530,129

UNITED STATES PATENT OFFICE 2,530,129

DRYING GASES

James H. McAteer, Cranford, Charles E. Morrell, Westfield, James K. Small, Union, and Howard L. Yowell, Elizabeth, N. J., assignors to Standard Oil Development Company, a corporation of Delaware No Drawing. Application December 2, 1944, Serial No. 566,404

7 Claims. (Cl. 183—114.2)

This invention relates to the drying of industrial gases and more particularly relates to the use of activated gels for this purpose.

Removal of water vapor from industrial gases has become increasingly important in chemical processes because in many cases the presence of water is a disadvantage. For example, in the preparation of Dry-Ice, carbon dioxide should be completely free from water vapor. Similarly, hydrocarbon gases to be piped long distances under pressure should be completely dry in order to avoid losses and inconvenience due to the formation of solid hydrocarbon hydrates. In catalytic processes the dryness of the gases used is essential to prevent inactivation of the catalyst, to reduce corrosion or to facilitate absorption of the reaction product, for example, in the preparation of sulfuric acid, the manufacture of hydrogen or the catalytic conversion of hydrocarbon oils. Drying of coke oven gas, cracked ammonia and natural gas used in steel and other plants in heat-treating furnaces especially for the bright annealing of copper and special carbon, silicon and stainless steels, eliminates discoloration which occurs when the gas contains water vapor. In the manufacture of synthetic rubbers the catalyst used is often diluted with a solvent such as alkyl halides. The presence of water vapor in the diluent will cause undesirable reduction in the catalytic activity of the catalyst. Similarly, when methyl chloride is used as a refrigerant the presence of water will cause corrosion of the equipment.

The drying of industrial gases with desiccants, such as calcium chloride, sulfuric acid, phosphorus pentoxide, caustic, oxide gels, and the like, is a well-established practice. Although these adsorbents are potentially very effective drying agents, most of them have a rather limited application because of such reasons as cost, small capacity for holding moisture, physical conditions, or difficulty of regeneration. However, the oxide gels, particularly those of silicon and aluminum, have the power of adsorbing many times their own volume of water vapor and can reduce the moisture content of industrial gases to a degree which permits them to be used without the dangers mentioned above. These gels retain their efficiency under suitable conditions even when they have adsorbed some 8–14% by weight of water. Furthermore, any plant using these gels is able to cope with variations in the moisture content of the gas being dried. Hence, a uniformly dry gas can be readily obtained and the volume of gas dried by a given volume of adsorbent is proportional to the initial water content. Also, for a given inlet moisture content the efficiency is not greatly reduced by appreciable increase in gas rate.

However, it has been found that when these gel adsorbents are used for the dehydration of certain industrial gases the activity of the adsorbents is so high that some of the gases tend to be catalytically changed either by reaction with the water or by decomposition so that the exit gases contain contaminating materials. For example, when drying methyl chloride with activated alumina, a portion of the methyl chloride reacts with the water under the catalytic influence of the highly active alumina to form a small amount of dimethyl ether which contaminates the dried methyl chloride.

It is, therefore, one object of this invention to dry industrial gases with oxide gels under such conditions that the gas being dried is not injuriously affected by the drying agent.

It is a further object of this invention to treat oxide gels used for dehydrating industrial gases so that their catalytic activity toward the gas being dried is lost without substantially impairing their ability to adsorb the water.

According to this invention, therefore, it has been found that the catalytic activity of alumina, or other types of oxide gels, toward industrial gases being dried can be reduced by treating the gel with a hydrogen halide or materials which yield hydrogen halide upon hydrolysis. The gel may be treated with the hydrogen halide prior to using it to dry the industrial gas or the hydrogen halide may be added to the wet gas to be dried.

Compounds suitable for the purpose of this invention include hydrogen chloride, hydrogen iodide, hydrogen bromide, various acyl halides, benzotrichloride, chloroform and carbon tetrachloride. When using the hydrolyzable compounds instead of the hydrogen halide itself, it is necessary that water be present to accomplish the hydrolysis. In those cases in which an alkyl halide is to be dried, it is sufficient if the catalyst is pretreated with a small portion of the alkyl halide itself. The hydrogen halide itself may be used in the anhydrous state at elevated temperatures or pressures, or it may be added either as a moist vapor or in the form of its aqueous solution.

In the preparation of synthetic rubbers when using aluminium chloride or other Friedel-Crafts type catalyst for the copolymerization of diolefins such as butadiene or isoprene with other reactants such as styrene, acrylonitrile, isobutylene, etc., it is usual to conduct the reaction in the presence of a solution of the Friedel-Crafts catalyst in a non-complex forming, non-poisoning solvent, such as an alkyl halide. Of these alkyl halides, methyl chloride is the most commonly used but other halides such as ethyl chloride, ethyl bromide and the like may be used, provided they are liquid at the temperature of reaction which in general is below 0° C. and is usually about −100° C. The Friedel-Crafts catalysts are easily poisoned by the presence of organic oxygenated compounds such as alcohols, ethers, aldehydes, esters, etc. For example the presence of more than 0.01% dimethyl ether in the methyl chloride solvent for aluminum chloride effectively poisons this catalyst when used in copolymerizing isobutylene and isoprene in the preparation of butyl rubber.

The following examples are indicative of the results obtained according to this invention when drying methyl chloride by pretreating the adsorbent with a portion of the methyl chloride to be dried.

*Example 1*

Samples of fresh "activated alumina" were used in a small pressure drying unit at 60° F. and 40 lbs./sq. in. gauge to dry a stream of methyl chloride which had been saturated with water at the same conditions. The fresh alumina charge was first heated in a dry nitrogen stream at 1 atmosphere to 350° F., was held for 2.5 to 3 hours at 350° F. and was then cooled to atmospheric temperature in the dry nitrogen stream. The moist methyl chloride was then passed through the drier case at a feed rate of about 1 lb. methyl chloride per pound of alumina per hour for several hours, samples being taken over about ½ hour periods of the run and analyzed for dimethyl ether by a chemical method having a sensitivity limit of 0.001–0.002 wt. % dimethyl ether.

Typical data with a fresh alumina charge are as follows:

| Drying Time, Hrs. | Weight Per Cent Dimethyl Ether |
|---|---|
| 2.7 | 0.045 |
| 4.7 | 0.023 |

The above data illustrate the ether-forming properties of a fresh charge of "activated alumina." The ether content of the dried methyl chloride used for the low temperature copolymerization of isobutylene and butadiene to form synthetic rubber is sufficiently high to seriously poison an aluminum chloride catalyst.

*Example 2*

A similar fresh charge of alumina, after regeneration in situ with nitrogen, was pretreated by passing methyl chloride over it at 350° F. and atmospheric pressure for 4 hours. It was then cooled and used to dry moist methyl chloride under the same conditions as before, with the following results:

| Cycle | Time, Hr. | Wt. Per Cent $H_2O$ [1] | Product Analysis, Weight Per Cent Dimethyl Ether | Remarks |
|---|---|---|---|---|
| 1 | 0.7 | 0.12 | 0.008 | 40 lb./sq. in. gauge; 59° F. saturators; Feed rate—1.08#/#/hr. |
|   | 2.2 | 0.38 | <0.001 | |
|   | 5.2 | 0.90 | <0.001 | |
| 2 | 0.7 | 0.16 | 0.007 | 40 lb./sq. in. gauge; 59° F. saturators; Feed rate—1.43#/#/hr. |
|   | 6.3 | 1.46 | 0.008 | |
| 3 | 0.7 | 0.15 | 0.002 | 40 lb./sq. in. gauge; 59° F. saturators; Feed rate—1.35#/#/hr. |
|   | 2.2 | 0.48 | 0.003 | |
|   | 6.2 | 1.34 |  | |

[1] Total water carried to alumina by feed in each cycle.

*Example 3*

A regenerated alumina purged with nitrogen was treated at atmospheric pressure at 350° F. with methyl chloride and later used as a drying agent with the following results:

| Cycle | Time, Hr. | Weight Per Cent $H_2O$ [1] | Product Analysis, Weight Per Cent | | Remarks |
|---|---|---|---|---|---|
| | | | Dimethyl Ether | $H_2O$ | |
| 1 | 0.9 | 0.22 | 0.002 | 0.005 | 35 lb./sq. in. gauge; 65° F. saturators; Feed rate—1.12#/#/hr. |
|   | 4.2 | 1.03 | <0.001 | 0.001 | |
|   | 7.0 | 1.71 | 0.002 | 0.008 | |
|   | 9.9 | 2.42 | 0.002 | 0.004 | |
|   | 11.9 | 2.82 | 0.002 | 0.006 | |

[1] Total water carried to alumina by feed.

*Example 4*

A sample of fresh, 4–8 mesh, Alorco Grade A activated alumina was treated at 80° F. with anhydrous hydrogen chloride at atmospheric pressure until the desiccant had gained approximately 6 per cent in weight. The pretreated alumina was evacuated to remove excess hydrogen chloride. The amount remaining constituted a minor portion of that originally added. The pretreated sample of activated alumina was charged to a laboratory pressure drying unit and tested for two drying cycles each consisting of a drying period with wet methylchloride feed and a regeneration period with nitrogen purge gas. The data are presented below:

| Cycle | Time, Hr. | Weight Per Cent Dimethylether in Dry Methylchloride |
|---|---|---|
| 1 | 1.0 | 0.009; 0.013 |
|   | 2.7 | 0.018 |
| 2 | 0.7 | 0.012; 0.013 |
|   | 1.7 | 0.004 |

The data in the above table when compared with the initial ether-forming properties of untreated alumina shown in Example 1, demonstrate the advantage of the pretreatment with hydrogen chloride.

The above example is not intended to limit the manner in which the hydrogen chloride may be added to fresh activated alumina. Thus, the hydrogen chloride may be added in the anhydrous state at elevated temperatures or pressures or it may be added either as a moist vapor or in the form of its aqueous solution.

The efficacy of hydrogen chloride for permanently suppressing ether formation tendencies of activated alumina does not, moreover, reside in its acidic properties. A sample of fresh activated alumina, pretreated with sulfuric acid, effected the hydrolysis of methyl chloride, when tested under the conditions outlined above, to an extent corresponding to that of untreated fresh activated alumina.

From the above examples it is clear that by pretreating alumina gel with a hydrogen halide or any hydrolyzable organic halide at elevated temperatures, the catalytic activity of the alumina is reduced to such a point that no substantial amount of dimethyl ether is formed during the dehydration step. Furthermore, the water content of the dried gas is reduced to a satisfactory point. For example, from Example 3 it is evident that a sample of fresh activated alumina over which methyl chloride had been passed at atmospheric pressure and 350° F. lost all its ether-forming properties and the water content of the dried gases was less than 0.01%.

While this invention has been described in connection with the drying of methyl chloride with activated alumina, it is to be understood this is by way of illustration only and the invention is intended to cover the use of other types of oxide gels for the drying of any type of industrial gas or mixture of gases which is susceptible to degradation by the highly active oxide gel. Furthermore, it is understood that numerous changes in the details of operation may be made without departing from the spirit and scope of the invention as hereinafter claimed.

The nature and object of the present invention having thus been set forth and specific examples of the same given, what is new and useful and desired to be secured by Letters Patent is:

1. The method for the pretreating of alumina as a drying agent which comprises heating activated alumina at a temperature of 350° F. while contacting the same with methyl chloride.

2. The method for the pretreating of alumina as a drying agent which comprises heating activated alumina up to a temperature of 80° F. in the presence of hydrogen chloride.

3. In a process for drying, by means of an oxide gel, an industrial gas which is chemically altered by contact with the gel, the improvement which comprises treating the oxide gel with a small amount of a hydrogen halide whereby the catalytic activity of the oxide gel toward the gas is substantially reduced.

4. In a process for drying, by means of an oxide gel, an industrial gas which is chemically altered by contact with the gel, the improvement which comprises treating the oxide gel with a small amount of a compound selected from the group consisting of hydrogen halides and hydrolyzable organic halides whereby the catalytic activity of the oxide gel toward the gas is substantially reduced.

5. In a process for drying, by means of an oxide gel, an industrial gas which is chemically altered by contact with the gel, the improvement which comprises treating the oxide gel with a small amount of a hydrolyzable organic halide whereby the catalytic activity of the oxide gel toward the gas is substantially reduced.

6. The process as defined by claim 1 wherein the activated alumina is heated at a temperature of 350° F. for a period of about 4 hours.

7. The process for removal of moisture from a gas comprising methyl chloride which comprises contacting said gas with activated alumina which has been pretreated with a compound selected from the group consisting of hydrogen halides and hydrolyzable organic halides, whereby the catalytic activity of the activated alumina to form dimethyl ether from said methyl chloride is completely avoided.

JAMES H. McATEER.
CHARLES E. MORRELL.
JAMES K. SMALL.
HOWARD L. YOWELL.

REFERENCES CITED

The following references are of record in the file of this patent:

UNITED STATES PATENTS

| Number | Name | Date |
|---|---|---|
| 1,976,875 | Connolly | Oct. 16, 1934 |
| 2,137,605 | Derr | Nov. 22, 1938 |
| 2,276,893 | Thomas | Mar. 17, 1942 |
| 2,293,901 | Hutchinson | Aug. 25, 1942 |
| 2,300,235 | Pines | Oct. 27, 1942 |
| 2,339,685 | de Simo et al. | Jan. 18, 1944 |